(12) United States Patent
Swartz

(10) Patent No.: US 7,486,664 B2
(45) Date of Patent: * Feb. 3, 2009

(54) INTERNET CONTROLLED TELEPHONE SYSTEM

(75) Inventor: Robert Swartz, Highland Park, IL (US)

(73) Assignee: Web Telephony, LLC, Deerfield, IL (US)

( * ) Notice: Subject to any disclaimer, the term of this patent is extended or adjusted under 35 U.S.C. 154(b) by 750 days.

This patent is subject to a terminal disclaimer.

(21) Appl. No.: 10/991,033

(22) Filed: Nov. 17, 2004

(65) Prior Publication Data

US 2005/0074104 A1   Apr. 7, 2005

Related U.S. Application Data

(62) Division of application No. 10/914,652, filed on Aug. 9, 2004, which is a division of application No. 10/228,596, filed on Aug. 27, 2002, now Pat. No. 6,785,266, which is a division of application No. 09/033,287, filed on Mar. 2, 1998, now Pat. No. 6,445,694.

(60) Provisional application No. 60/040,046, filed on Mar. 7, 1997.

(51) Int. Cl.
*H04L 12/66* (2006.01)

(52) U.S. Cl. ........................................ 370/352; 370/493
(58) Field of Classification Search ........................ None
See application file for complete search history.

(56) References Cited

U.S. PATENT DOCUMENTS 5,471,522 A * 11/1995 Sells et al. ............... 379/93.11

(Continued)

OTHER PUBLICATIONS

Low, C., "The Internet telephony red herring," Global Telecommunications Conference 1996, Communications: The Key to Global Prosperity, Nov. 1996, pp. 72-80, 1822.

(Continued)

*Primary Examiner*—Phirin Sam
(74) *Attorney, Agent, or Firm*—Charles G. Call

(57) ABSTRACT

An Internet controlled telephony system employing a host services processor connected to a subscriber via the Internet and further connected to the public switched telephone system (PSTN). The subscriber employs a web interface to populate a database with preference data which is used by the host services processor to handle incoming calls and establish outgoing telephone connections in accordance with the preference data provided by the subscriber. Incoming calls to a telephone number assigned to the subscriber may be automatically forwarded to any telephone number specified by the preference data. The subscriber may also use the web interface to specify whether call waiting is to be activated, to screen or reroute calls from designated numbers, for recording voice mail messages in designated voice mailboxes, for selectively playing back voice mail messages via the web interface or for forwarding voice mail as an email attachment, for handling incoming fax transmissions using character recognition and email attachment functions, and for automatically paging the subscriber when incoming voice mail, fax or email messages are received, all in accordance with the preference data supplied by the subscriber using the web interface. Outgoing connections and conference calls may be initiated using the web interface, and the subscriber may block the operation of caller identification functions. Call progress information may be visually displayed to the subscriber during calls by transmitting web pages from the host services computer to the subscriber's web browser.

27 Claims, 11 Drawing Sheets

U.S. PATENT DOCUMENTS

| | | |
|---|---|---|
| 5,533,115 A | 7/1996 | Hollenbach |
| 5,534,913 A * | 7/1996 | Majeti et al. ............... 725/114 |
| 5,568,540 A | 10/1996 | Greco et al. |
| 5,712,903 A | 1/1998 | Bartholomew et al. |
| 5,737,395 A | 4/1998 | Irribarren |
| 5,742,596 A | 4/1998 | Baratz |
| 5,761,294 A | 6/1998 | Shaffer |
| 5,764,639 A | 6/1998 | Staples |
| 5,764,910 A | 6/1998 | Shachar |
| 5,838,682 A | 11/1998 | Dekelbaum |
| 5,867,495 A | 2/1999 | Elliott |
| 5,870,550 A | 2/1999 | Wesinger, Jr. |
| 5,903,845 A | 5/1999 | Buhrmann et al. |
| 5,905,476 A | 5/1999 | McLaughlin |
| 5,914,951 A | 6/1999 | Bentley |
| 5,917,817 A | 6/1999 | Dunn |
| 5,940,598 A | 8/1999 | Strauss |
| 5,946,386 A | 8/1999 | Rogers |
| 5,991,292 A | 11/1999 | Focsaneanu |
| 5,995,615 A | 11/1999 | Miloslavsky |
| 5,999,965 A | 12/1999 | Kelly |
| 6,014,687 A | 1/2000 | Watanabe et al. |
| 6,031,836 A | 2/2000 | Haserodt |
| 6,035,017 A | 3/2000 | Fenton et al. |
| 6,044,107 A | 3/2000 | Gatherer |
| 6,052,372 A | 4/2000 | Gittins |
| 6,069,890 A * | 5/2000 | White et al. ............... 370/352 |
| 6,088,717 A * | 7/2000 | Reed et al. ............... 709/201 |
| 6,091,808 A | 7/2000 | Wood |
| 6,104,711 A | 8/2000 | Voit |
| 6,115,737 A | 9/2000 | Ely |
| 6,130,933 A | 10/2000 | Miloslavsky |
| 6,131,095 A | 10/2000 | Low |
| 6,161,128 A | 12/2000 | Smyk |
| 6,188,683 B1 | 2/2001 | Lang |
| 6,199,076 B1 | 3/2001 | Logan |
| 6,201,863 B1 | 3/2001 | Miloslavsky |
| 6,400,806 B1 * | 6/2002 | Uppaluru ............... 379/88.02 |
| 6,430,282 B1 | 8/2002 | Bannister |
| 6,633,630 B1 * | 10/2003 | Owens et al. ............ 379/93.24 |
| 2001/0040885 A1 | 11/2001 | Jonas |
| 2007/0083656 A1 * | 4/2007 | Bobo, II ............... 709/226 |

OTHER PUBLICATIONS

Simeonov et al., @INGate: A Dist, Intelligent Network Approach To Bridge Switching And Packet Networks, 6th Int'l Conf. on Computer Comm & Networks Sep. 1997, pp. 358-363.

Mane et al., "Meet your communication intelligent agent on the World-Wide Web," 16th Int'l Symposium on Human Factors in Telecom. May 12-16, 1997, pp. 435-441.

\* cited by examiner

Fig. 5

Phone Book - Netscape

File Edit View Go Communicator Help

*Click on any name to view or revise detail*

| NAME | PHONE NO. | FAX NO. | EMAIL |
|---|---|---|---|
| Abrams, John | (202) 234-1234 | (202) 234-1299 | abrams@lincolnx.com |
| Baxter Chemical | (312) 123-4567 | (312) 123-9921 | sales@baxterchem.com |
| Bartholomew, Ken | | | kbart@wiggles.com |
| Branson, Charles | (415) 555-1212 | (415) 345-9908 | |
| Candy, Wilson | (617) 890-0987 | | CWilson12@aol.com |

272 — A-C | D-F | G-I | J-L | M-O | P-R | S-U | V-Z | Add New — 274

INTERNET CONTROLLED TELEPHONE SYSTEM

CROSS REFERENCE TO RELATED APPLICATION

This application is a division of U.S. patent application Ser. No. 10/914,652 filed Aug. 9, 2004, which is a division of U.S. patent application Ser. No. 10/228,596 filed on Aug. 27, 2002 which issued as U.S. Pat. No. 6,785,266 on Aug. 31, 2004 and which is a division of U.S. patent application Ser. No. 09/033,287 filed on Mar. 2, 1998 which issued as U.S. Pat. No. 6,445,694 on Sep. 3, 2002 and which was a non-provisional of U.S. Provisional Patent Application Ser. No. 60/040,046 filed on Mar. 7, 1997. This application claims the benefit of the filing dates of each of the above-noted applications. The disclosures of each of the above-noted applications and patents are incorporated herein by reference.

FIELD OF THE INVENTION

This invention relates to computer controlled telephone systems and more particularly to a telephone system which may be controlled using commands transmitted from a subscriber location over the Internet to a host computer which provides telephone services.

BRIEF DESCRIPTION OF THE DRAWINGS

FIG. 5 is a screen display presented to enable the subscriber to review and select particular persons or firms listed in a phone book database;

Figure 11:
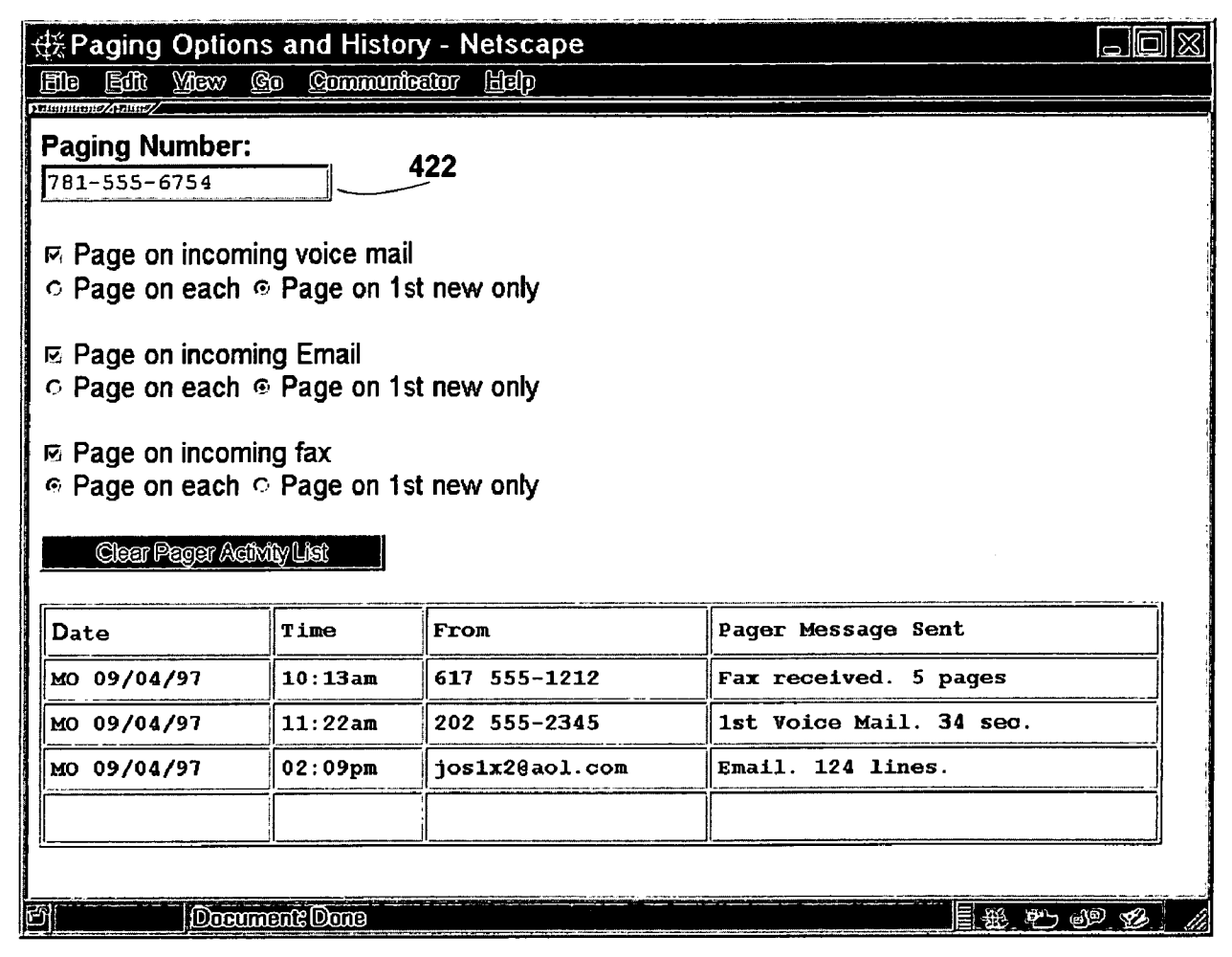

FIG. 11 is a screen display which enables the user to select various options and control the operation of an automatic paging system implemented by the disclosed embodiment of the invention.

DETAILED DESCRIPTION

The infrastructure used to implement the present invention may consist entirely of conventional and readily available hardware and software components. As will be seen from the discussion that follows, the hardware and software used at the subscriber (client) location is already present and in use in many well equipped home and small office computer installations. Similarly, the principal hardware and software components needed by the host services computer (server) are similarly readily available, as are the software development tools needed to prepare the limited amount of special purpose programs required for execution at the server.

Figure 1:
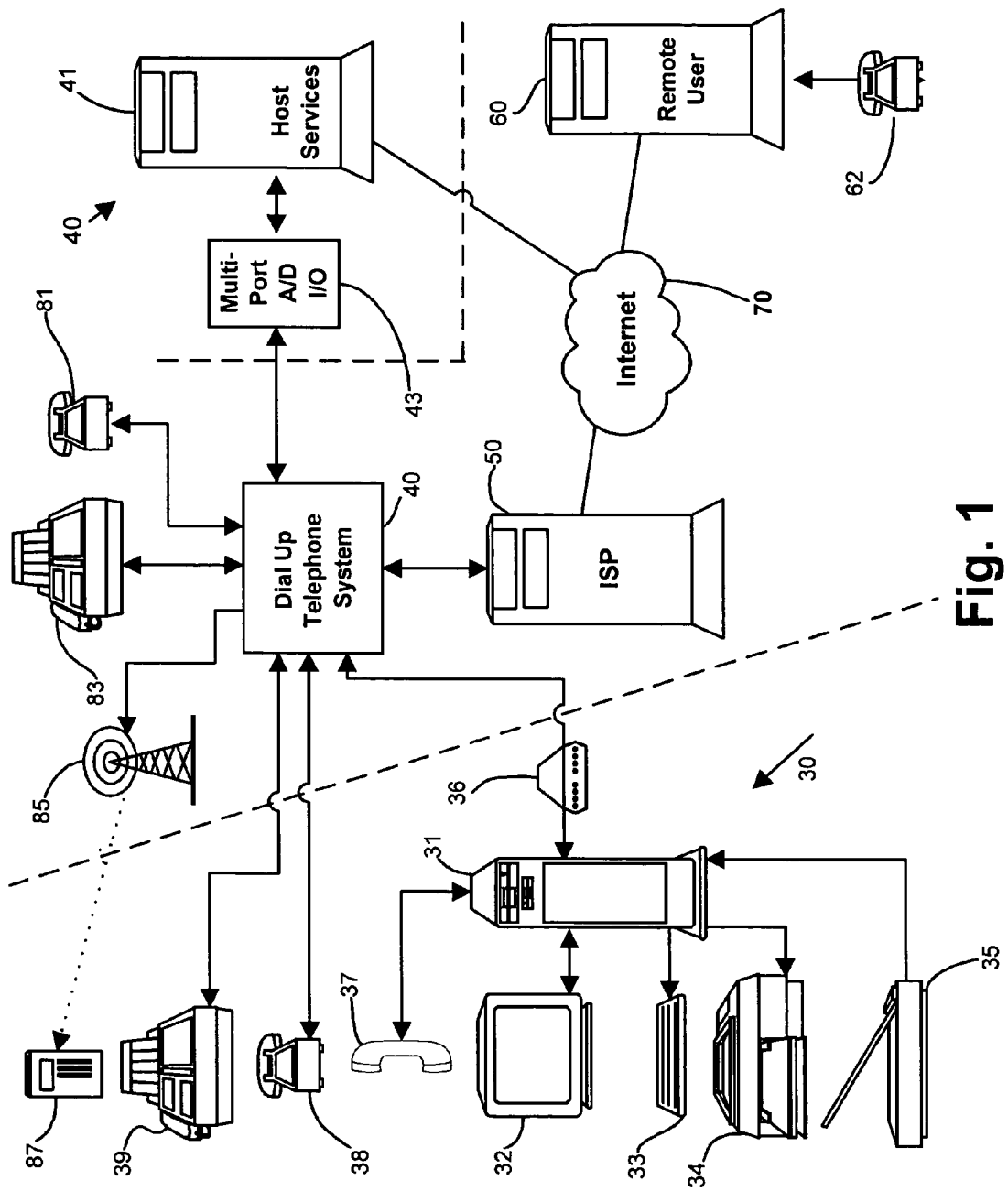
FIG. 1 is a schematic diagram showing an illustrative arrangement of hardware components which provide the infrastructure for implementing a preferred embodiment of the invention.

FIG. 1 of the drawings shows the manner in which various conventional hardware components may be interconnected to provide an illustrative hardware infrastructure for implementing the invention. The arrangement seen in FIG. 1 provides the facilities needed for controlling a variety of communications services, including telephone, email, fax and paging services provided by a host services computer operating under the control of either or both (1) a World Wide Web interface and (2) a telephone interface.

A typical subscriber location seen at 30 includes, by way of example, a personal computer 31, a monitor 32 for displaying text and images, a keyboard 33 for entering data and commands from the user, a printer 34, a digital scanner 35, a modem 36 and a microphone and headset/speaker represented in FIG. 1 by the handset 37.

The modem 36 is used to establish a dialup telephone connection via the conventional telephone network 40 to a remote computer 50 which operates as an Internet Service Provider (ISP). The ISP computer 50 provides the connected computer 31 with access to the Internet, enabling the subscriber computer 31 to exchange data via the Internet seen at 70 in FIG. 1 with other computers, such as the computer 41 at the host services location 40 and a computer 60 which is representative of a selected one of the millions of remote computers connected to the Internet. The dialup connection between computers 31 and 50 seen in FIG. 1 is merely illustrative of one common method for connecting a subscriber location to the Internet. Alternatively, the conventional modem 36 may be replaced by a cable modem, satellite connection, local area network gateway, proxy server or a connected router. All such communications facilities and the components for providing Internet access are conventional.

The host services computer 41 is connected to the Internet 70 and employs a multi-port input/output (I/O) unit 43 to permit a number of outside callers to be concurrently connected via the dialup telephone system 40. The dialup telephone system 40 also provides conventional connections to a conventional telephone stationset 38 and a conventional facsimile machine 39, both of which are provided with separate assigned lines and telephone numbers for use at the subscriber location 30. In addition, the telephone system 40 may also interconnect any other connected telephone or facsimile machine, as illustrated at 81 and 83 respectively, as well as other services, such as a remote radio transmission facility 85 used to provide communication to a pager 87 which is assigned to and used by the subscriber. Similarly, the subscriber may utilize a cellular phone (not shown) when traveling to remote locations. As discussed below, the subscriber controls and uses the host service computer using these conventional instrumentalities. Importantly, conventional web browser software running on the computer 31 may be employed, along with voice commands and DTMF (dialtone) signaling via the conventional telephone hookup, to control the state and function of the host services computer 41.

The host services computer may alternatively take the form of an Intranet server which is connected to a plurality of client (subscriber) computers by means of a local area network and/or a wide area network. In addition, the host services computer may be connected via a multiport I/O device to serve a number of telephone stationsets. In this arrangement, the host services computer operates as both a shared computer resource for the connected client computers and provides PBX services to the connected subscriber telephone stationsets. Internet connections are provided via an Internet gateway on the LAN/WAN such that both the host services computer and the connected subscriber computers have Internet access.

Note further that, with the host services computer operating as a PBS, a direct telephone voice line connection may be established between host services computer and individual telephone subscriber stationsets. In this way, incoming calls may be directly connected to the called subscriber stationset without forwarding the incoming call through the dialup telephone facility. A multiplexed telephone line, such as a leased T1 carrier line, may be used to connect a plurality of subscriber phones to the host services computer, enabling the servicing of branch offices. By concentrating traffic in a shared wideband leased line, branch locations can be served through a central PBX provided by the host services computer at less cost by eliminating individual lines.

The host services computer 41 may employ conventional server operating system software, such as the SCO OpenServer operating system sold by The Santa Cruz Operation, Inc. (SCO), Santa Cruz, Calif. 95061. This client/server UNIX operating system for Intel processor-based platforms includes graphical system administration and software management facilities for managing both local and remote systems. The program's Motif GUI provides the look and feel of Microsoft Windows and includes TCP/IP communication gateway services for local and network access external information services. The computer 41 may advantageously equipped with an enhanced audio input/output facilities, such as the Dialogic D/240SC 24 channel digital interface board which provides a voice channel interface between the computer 41 and incoming audio channels from the connected telephone lines as well as call management functions. The D/240SC is marketed by Dialogic Corp. of Parsippany, N.J. 07054. As discussed below, it is the principal function of the host services computer 41 to receive and respond to data and commands received from the subscriber location 30, either in the form of HTML form submissions or in the form of voice and/or dialtone commands, and to perform requested functions in response to those commands.

Web Interface

A wide variety of available interface mechanisms can be utilized to facilitate communications and control between the subscriber and the host services computer. As described in more detail below, a highly effective interface may be readily implemented using a conventional HTML web pages which are sent to the subscriber computer from the host services computer, including HTML forms which are transmitted to request and accept specific information from the subscriber using as "fill-in-the-blanks" input boxes, memo boxes, check boxes, and radio buttons. Javascript may be advantageously included in the HTML pages to provide validity checking of entered data by the subscriber computer. Alternatively, these and other interface functions and "client-side" operations may be implemented special purpose "plug-in" programs which work with a conventional browser program, or by Java and/or Active-X applets which are transmitted from the host services computer for execution on the subscriber computer using facilities provided by the browser. If desired, special-purpose client application programs may be used to directly communicate with the host services computer without using a general purpose browser.

In one particularly useful form, the functions performed at the subscriber location as contemplated by the present invention can advantageously be implemented by routines stored as dynamic link libraries which make telephone subscriber functions available through an open application program interface (API). By way of example, the widely used Microsoft Windows 95 operating system provides specifications for a robust computer/telephone interface named "TAPI" which is fully documented in the Microsoft Win32 Software Development Kit (SDK) which includes documentation, tools, and sample code to assist application programmers in adapting programs to be compatible with TAPI. Two documents, the *Microsoft Telephony Programmer's Reference* and the *Microsoft Telephony Service Provider Interface (TSPI) for Telephony*, are also available from Microsoft Corp. to provide additional development guidance. The programmer's reference is intended to document the functionality that an application using TAPI will need. The service provider documentation assists developers and telephone equipment vendors in writing their own TAPI services.

Telephone services are integrated into Windows using the Windows Open Systems Architecture ("WOSA"). WOSA uses a Windows dynamic-link library (DLL) that allows software components to be linked at runtime. In this way, applications are able to connect to services dynamically. An application needs to know only the definition of the interface, not its implementation. Telephony services under Windows follow the WOSA model. This means that there exists a Telephony API, which is the application programmers access to telephony services, a Telephony SPI (Service Provider Interface) which is implemented by telephony service vendors, and a Telephony Dynamic Link Library (the TAPI DDL) which is part of the Windows operating system. Applications are presented with a uniform set of devices accessed uniformly via the API without needing to know which service provider actually ends up controlling which device. Similarly, service providers just execute requests on behalf of the Windows Telephony DLL; they are unaware that these requests are the result of multiple applications using the API. The SPI definition reflects this single user model at the service provider level. All this multiplexing demultiplexing of requests and replies is confined to the Telephony DLL. In an environment with multiple PCs on a local area network, it is possible to develop applications and/or service providers that are distributed in nature. With a distributed service provider, a service provider instance on one client PC is able to communicate with its peers on other client PCs, providing potentially a more powerful model as it can combine knowledge about multiple client PCs that may be involved with the same call. The services provided by the line and phone abstractions of the Telephony SPI can be partitioned into three classes:

(1) Basic Services are a minimal subset of core services. They must be provided by all service providers. The functions contained in basic telephony roughly correspond to that of POTS. Phone device services are not part of basic telephony.

(2) Supplementary Services are the collection of all the services defined by the SPI, but not included in the basic telephony subset. It includes all so-called supplementary features found on modem PBXs including hold, transfer, conference, park, etc. All supplementary features are optional. This means that a service provider decides which of these services it does or does not provide. The TAPI DLL can query a line or phone device for the set of supplementary services it provides. Note that a single supplementary service may consist of multiple function calls and messages. It is important to point out that the Telephony SPI defines the meaning (i.e., behavior) for each of these supplementary features.

(3) Extended Services (or Device Specific Services) include all service provider defined extensions to the SPI. A mechanism is defined in the SPI, and reflected in the API, that allows service provider vendors to extend the Telephony SPI using device-specific extensions. Since the SPI only defines the extension mechanism, definition of the extended service behavior must be completely specified by the service provider. The extension mechanism allows a service provider to define new values to enumeration types and bit flags, as well as to add fields to data structures. The interpretation of extensions is keyed off of the service provider's manufacturer ID. Special function and callbacks are provided in the SPI that allow an application to directly communicate with a service provider. Many of the control functions contemplated by the present invention which are controlled through the TAPI interface by the SPI DLL are in fact executed, as will be described, by the host services computer in ways that are invisible to the user or the application program which is executing on the subscriber computer.

As an alternative to the TAPI implementation noted above, the host services computer may present an API to programs which execute on the subscriber computers and communicate with the host computer over the Internet or an equivalent data pathway. With the remote host services computer providing an API which makes available a set of telephony functions, application programmers may implement a rich and expandable set collection of special purpose programs which execute on the subscriber computer to implement the features and functions such as those described below in the example HTML/CGI implementation of the invention. When these application programs take the form of Java applets or Active-X applets that are down-loadable from the host services computer to the subscriber computer, the necessity for resident special purpose software at the subscriber location is eliminated and the cost savings associated with "thin client" network computer architectures are preserved.

HTTP/CGI Control

While such special purpose programs of the type noted above provide a high degree of interoperability with other application programs, they must be especially loaded for execution into each subscriber computer. By using the capabilities found in existing web browser software, it is possible to provide the desired functionality with no new software of any kind being required at the subscriber location. Thus, in perhaps its simplest form, the present invention can be readily implemented by using a conventional web browser program (e.g. Netscape Navigator or Microsoft Explorer) which executes on the subscriber computer 31 seen in FIG. 1, and conventional web server software (e.g. BSD Unix 2.2, Apache 1.1.1) or an SQL server which interoperates with a relational database (such as the Sybase SQL Server V.11). On the server side, web page requests or form submission from the subscriber computer's web browser are sent to the host services computer 41 using the HTTP protocol. At the host services computer 41, the received transmissions from the subscriber location may be handled by Common Gateway Interface (CGI) programs which typically process information from the subscriber and return HTML pages for display on the subscriber's web browser. The HTTP/CGI interface infrastructure is conventional and is described, for example, in *Developing CGI Applications with PERL*, by John Deep and Peter Holfelder, John Wiley & Sons (1966), ISBN 0-471-14158-5.

To establish a working relationship between the host services computer and the subscriber, the host services computer makes available to the public at large a "home page" at a predetermined URL (Universal Resource Locator). The home page, when displayed, identifies and makes available descriptive information about the system, inviting members of the public to subscribe to the offered services by displaying, completing and submitting a subscription form.

The HTML subscription form enables user to establish an account with the operator of the host services computer. When the subscription form is submitted, the host services computer stores the descriptive information entered on the submitted form in persistent storage (typically a database on a local magnetic disk drive) accessible to the host computer. As is conventional, the subscription process may advantageously employ conventional secure encrypted communications protocols for obtaining the subscriber's credit card number and authorization to facilitate billing. As will be understood, the subscriber may be billed for services based on monthly fees or measured use of the system at rates which, because of economies achieved by the system, may be significantly lower than the costs associated with such services when provided by conventional means. When the subscription form is received and accepted, the new subscriber may be sent a user ID and password (which may be done by conventional mail at the same time user manuals or other information is supplied to the subscriber).

In accordance with an important feature of the invention, the subscriber can access his or her personalized phone services and database from any computer having access to the Internet, and need not be limited to a particular computer on which special programs or data are stored. At the same time, the password protection afforded by the system assures the security of the information stored for access by the subscriber. The host services may be advantageously provided by an existing services provider, such as an Internet Services Provider (ISP), a cable modem company, a telephone access provider, a telephone answering service, a paging services company, or the like.

At the same time the new subscription account is established, the host service assigns a telephone number to the new subscriber service and informs the subscriber of that assigned number (which may conveniently be an 800 or 888 number, eliminating the need for the subscriber to independently obtain 800 or 888 number service). This telephone number will be referred to hereafter as the "assigned subscriber number". Any call to the assigned subscriber number is answered by and handled by the host services computer 41 in the manner determined in part by preference data provided by the subscriber using HTML forms as described in more detail below, or by transmitting voice or DTMF commands over the conventional telephone system.

Using the web browser software running on the subscriber computer 31, the subscriber accesses a predetermined (and typically bookmarked) web page at a predetermined URL. The host services computer responds with a request to the subscriber to enter his or her assigned user ID and password, and if that step is performed satisfactorily, the host services computer transmits a main menu webpage of the type illustrated in by FIG. 2.

Figure 2:
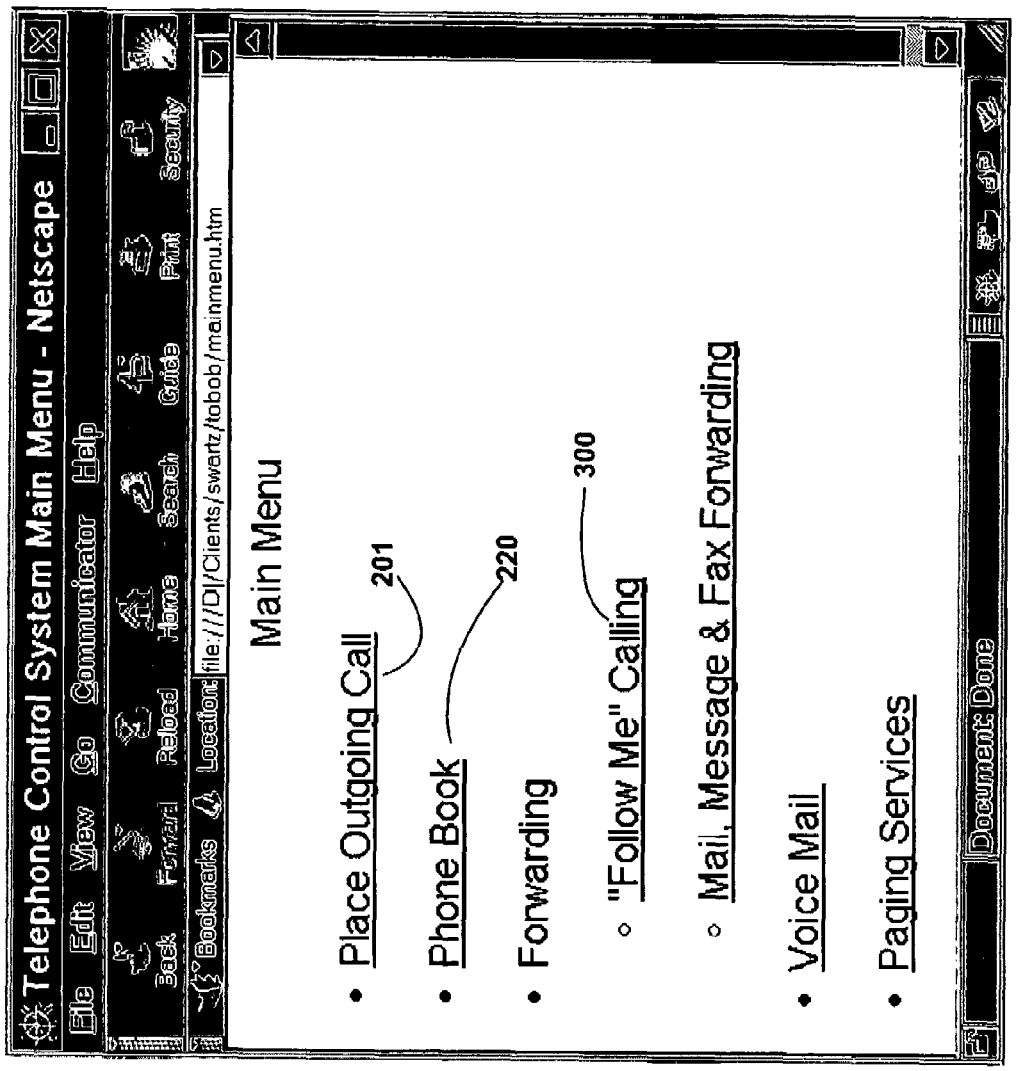
FIG. 2 shows the screen display of a main menu giving options available to the subscriber.
Figure 3:
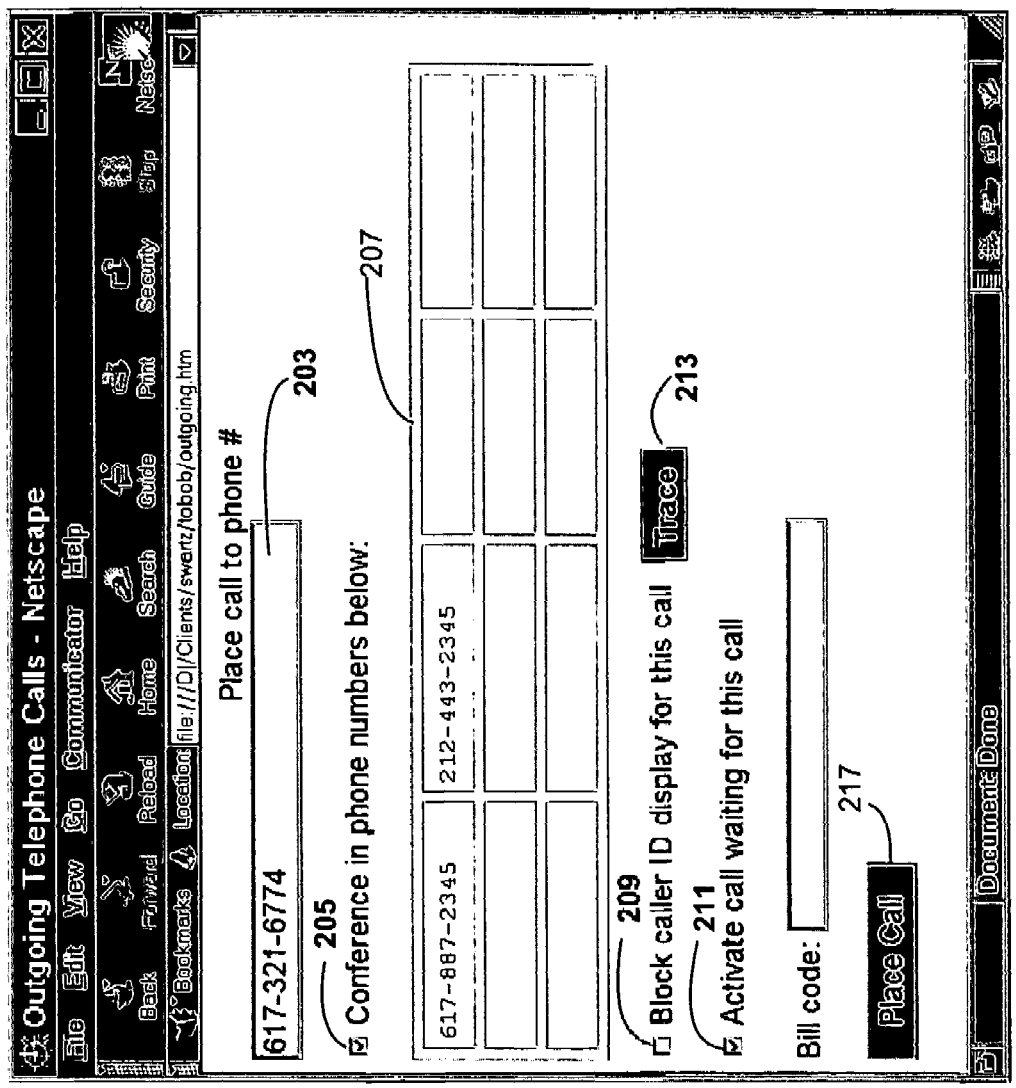
FIG. 3 illustrates a screen displayed to enable the subscriber to place a call and request a conference call.
Figure 7:
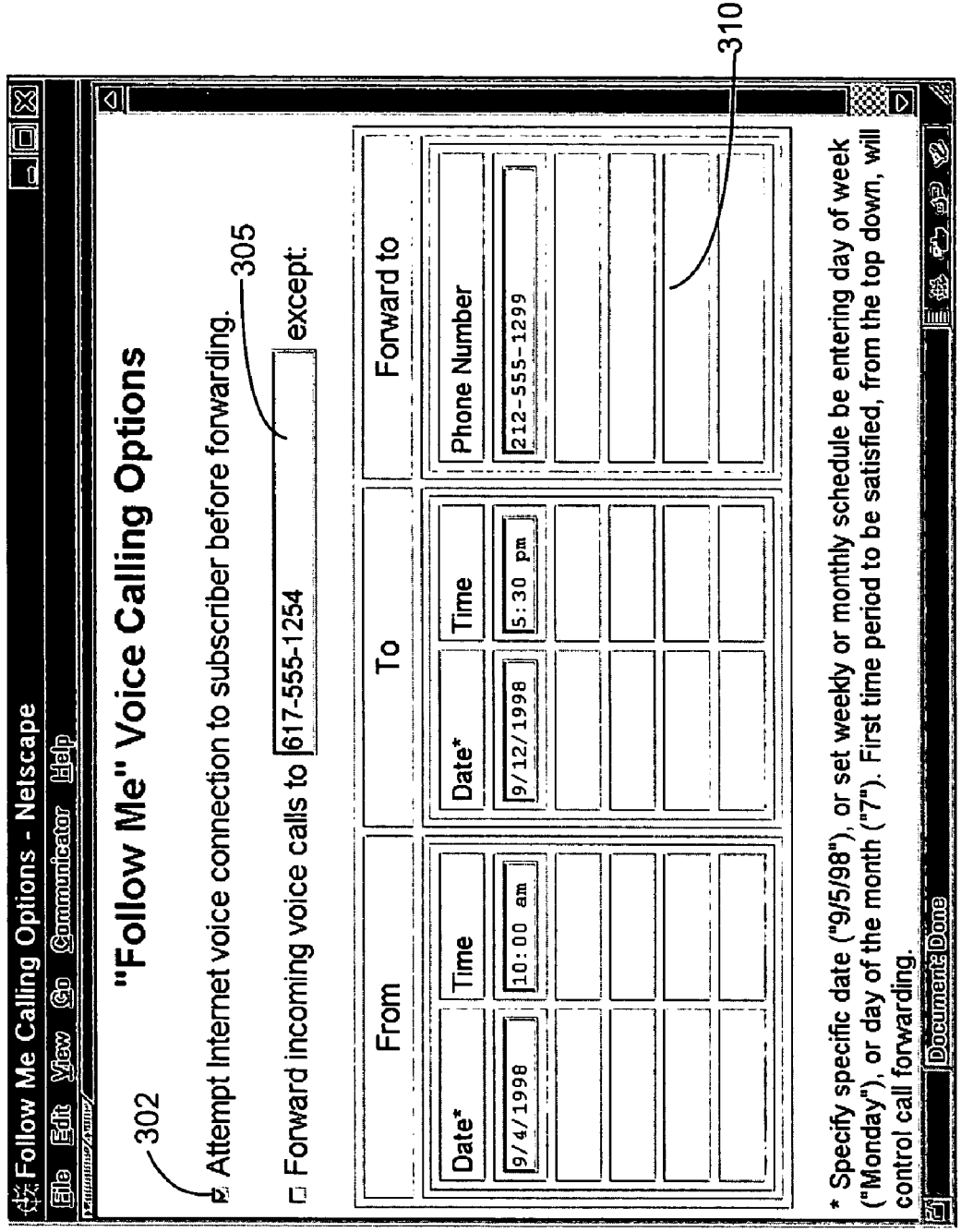
FIG. 7 illustrates a screen which is displayed to enable call forwarding and "follow me" calling.
Figure 8:
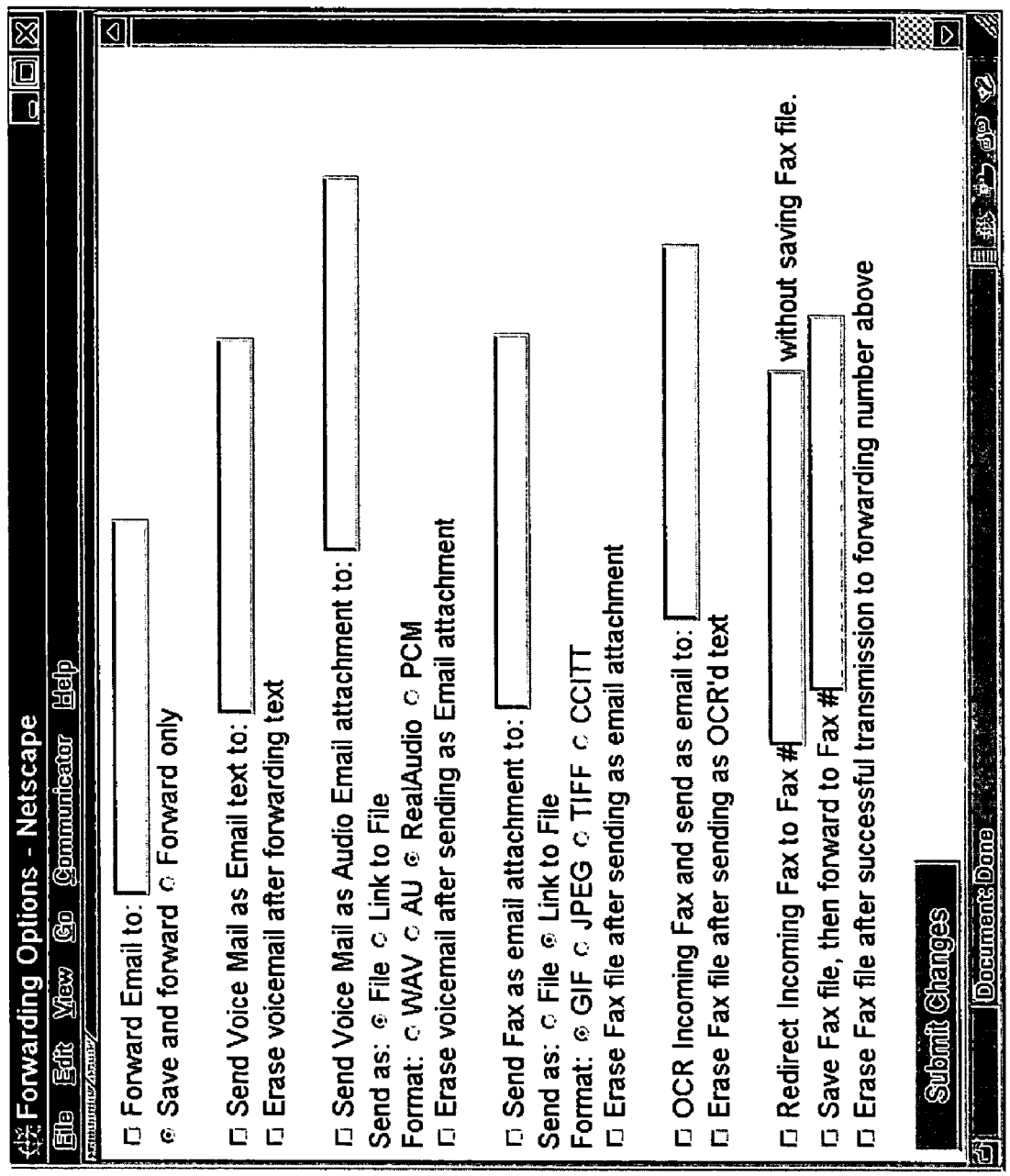
FIG. 8 illustrates a further screen display which enables the subscriber to select and change a variety of call and message forwarding options.
Figure 9:
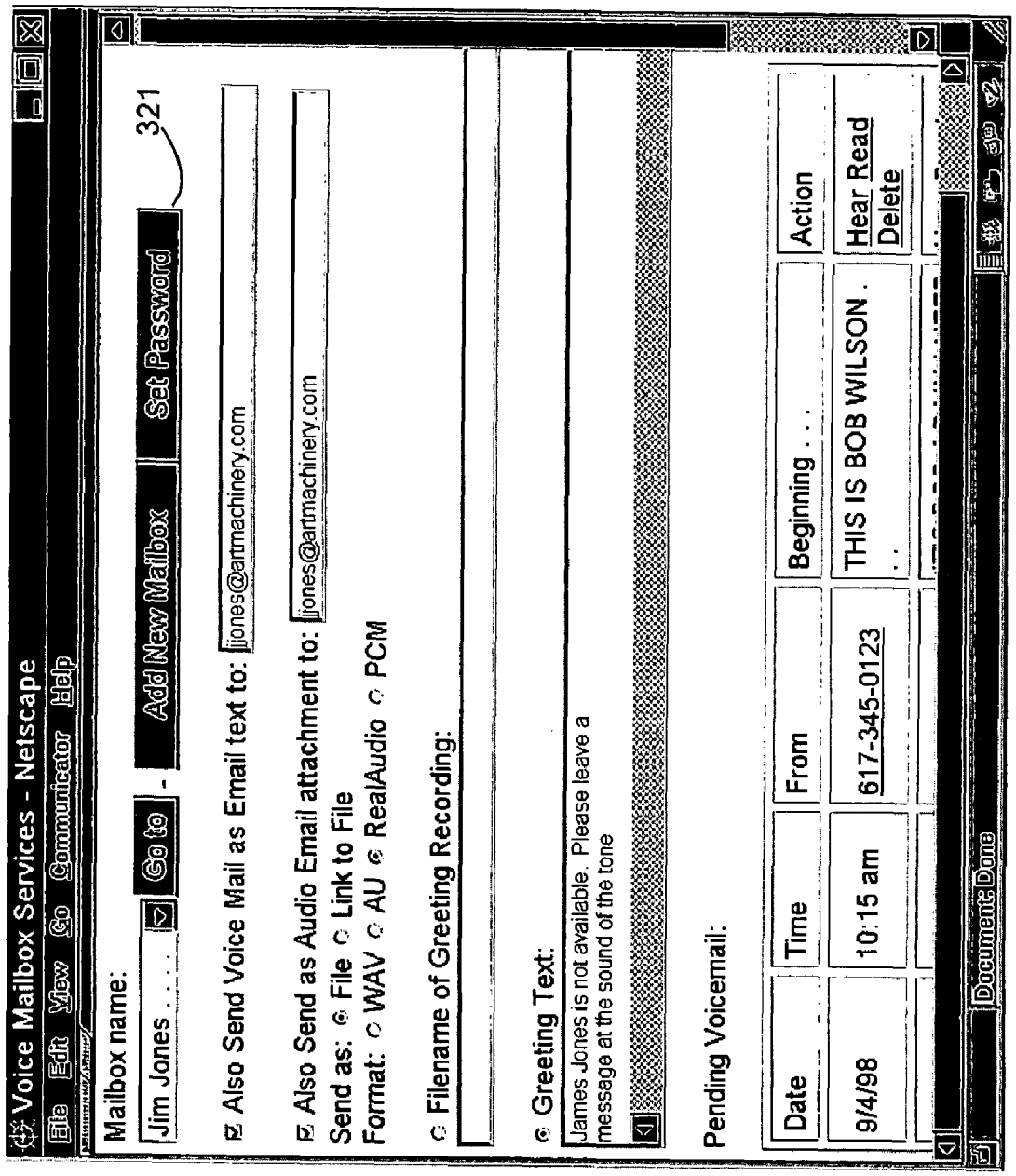
FIG. 9 is a screen display which enables the subscriber to create and specify features of a voice mailbox.

The main menu page seen in FIG. 2 provides hypertext links to six different web pages, each of which is also illustrated in the drawings as shown by the table below:

| Menu Anchor Text | Drawing |
| --- | --- |
| Place Outgoing Call | FIG. 3 |
| Phone Book | FIG. 5 |
| "Follow Me" Calling | FIG. 7 |
| Mail, Message & Fax Forwarding | FIG. 8 |
| Voice Mail | FIG. 9 |
| Paging Services | FIG. 11 |

Place Outgoing Call

When the subscriber "clicks on" the anchor text "Place Outgoing Call" at 201 on the main menu webpage seen in FIG. 2, the browser sends a request for a further webpage specified by a URL associated with the anchor text in the HTML text which created the main menu.

Note that, in general, the value of a URL sent when a hyperlink is activated is the file location of web page or a predetermined CGI script, along with parameters passed to the server for execution by that script. Note that, in general, because the hypertext links (URL's) that are sent to the server are formed from text on pages written by the server, the URL may contain state information, either in the form of a file designation or in the form of CGI parameters, which identify the subscriber as well as the context in which the subscriber is making a request, and the specific request or data being sent to the server.

The selection by the subscriber of the main menu option represented by the hypertext anchor text "Place Outgoing Call" causes the HTML for displaying the form seen in FIG. 3 to be displayed by the browser. This form allows the user to enter a phone number to be called in the input line form control at 203. In addition, by clicking on the checkbox at 205 and entering one or more numbers in the input line boxes arrayed in a table at 207, the subscriber may specify the telephone numbers of additional parties to be included in a conference call. The conference call may be implemented directly by the host services computer 41 which places all calls to all of the numbers specified in the form seen in FIG. 3, or the conference call may be requested from the dial up telephone system.

Control of Telephone Central Office Services

Most public telephone services offer a variety of service functions which can be advantageously implemented using the user interface features of the present invention. To use many of these functions, the user must normally know and key-in control key sequences on the telephone keypad. In accordance with a feature of the present invention, these functions may be advantageously automated by the host services computer in response to easily understood menu selections made by the subscriber using the webpage interface or voice command interface. The conventional telephone system functions which can be advantageously implemented in this way include those shown in the following illustrative examples, described using the control dialtone key sequence command codes employed by the Bell Atlantic telephone service. These functions include the activation and deactivation of call waiting services under the control of the HTML checkbox form control seen at 211 in FIG. 3, the blocking and unblocking of caller ID displays in response to the checkbox entry at 209 in FIG. 3, and the activation of call tracing.

As an alternative to the use of DTMF key sequences to control telephone central offices, the SS7 call management protocol may be used. AT&T developed and made available a set of 1A ESS features called LASS (Local Area Signaling Services). As expanded by customized software enhancements originating with Pacific Bell, these functions are also available under the name CLASS (Custom Local Area Signaling Services). These services allow increased customer control of phone calls. Existing customer lines can be used provide call management and security services. A key feature of CLASS resides in the ability of the terminating office to obtain the identity of the calling party. Special terminating treatment based on the identity of the calling party can then be provided. The CLASS features are dependent upon an SS/CCS (Signaling System 7/Common Channel Signaling) network and use the SS7 Call Management Mode of operation. SS7 is an advanced signaling system that features flexible message formatting, high speed data transmission (56/64 kbps) and digital technology. CCS is defined as a private network for transporting signaling messages. In the existing voice and signaling network, signaling and voice use the same path but cannot use it at the same time. With SS7, signaling and voice have been separated. Signaling (SS7) is over a high-speed data link which carries signaling for more than one trunk. In the context of the present invention, the SS7 protocol provides a more direct and effective way for the host services computer to control the functions of the connected dialup telephone system than the conventional DTMF signaling mechanisms which are set forth here for simplicity.

If the subscriber wishes to prevent the called parties caller ID system from displaying the subscribers number on the next call, the box at 209 is checked and the host services computer requests the central office to perform per call blocking by sending the dialtone sequence "*67" to the central office. If the telephone company has been requested to block caller ID display on all outgoing calls, the line associated with checkbox 209 would instead read "Unblock display of your number by caller ID for next call only" and the host services computer would instead sends the sequence "*82" to remove perform line blocking for the next call only. The host services computer can interrogate the central office to determine whether or not line blocking has been requested by dialing a predetermined number which will provide an announcement indicating line blocking status for the calling number.

The functions noted above may be performed by the telephone central office in response to command codes sent from the host services computer to the central office. Call waiting is activated when the checkbox at 211 is checked by sending the key sequence "*70" to the central office, and is deactivated by the sending same code when the box on line 211 is unchecked.

If only one additional party is to be conferenced in, the commonly available "three way calling" service offered by telephone system may be used. When the user enters the telephone number of the third party to be added to an existing call at 207 and checks at 205, the host services first dials the number entered in input line 203 and, when that connection is established, the computer flashes the line (i.e., places the line on-hook momentarily), waits for three beeps and a dial tone from the central office, dials the number previously entered at 207, and when the added party answers, again flashes the line to bring all three parties together for the desired conference call. If the third party line does not answer or is busy, the subscriber is notified of that condition and the line is flashed twice to reconnect the first call.

When the button 213 on the form seen in FIG. 3 is pressed, a command is sent to the host services computer request a trace of the last incoming call. In response, the host services computer returns a form (dialog box) advising the subscriber of a service charge will be incurred and requesting confirmation that the requested function should nonetheless be performed. If confirmed by the subscriber, the host services computer transmits the dialtone key sequence "*57" to the central office, which thereafter provides announcements to the subscriber indicating that the call was traced and providing further instructions.

After the information in the input line 203 identifying the number to be entered is completed, and optionally the conferenced-in numbers are entered at 207, the user presses the button labeled "Place Call" at 217. In response, the server dials the call to establish a voice connection with the called party or parties, and displays the call-in-progress form seen in FIG. 4.

As the call progresses, the normal audible signals (busy signals, ringing signals, etc.) are sent to the subscriber over the telephone voice connection, and may be supplemented by additional voice status announcements. Typically, such notifications to the subscriber may be sent by sent by both voice announcement and audible signals over the voice connection or by sending status displays in the form of revised HTML pages for display on the subscriber's monitor. In accordance with the invention, notification messages displayed on the monitor are frequently less disruptive; accordingly, by checking the checkbox seen at 223 on the form of FIG. 4, the subscriber may disable the supplemental voice announcements.

The full identification of the incoming party is displayed on the call-in-progress form as indicated at 224. To provide this complete display, the host services computer matches the telephone number of the calling telephone, provided by the telephone system's automatic number identification (ANI) service, against a "phone book" database (to be discussed later) of frequently used phone numbers to obtain, in addition to the ANI information, other descriptive information about the calling party. The name or number of the calling party may form the anchor text for a hyperlink to even more detailed phonebook information about the party of the type to be discussed later in connection with FIGS. 5 and 6.

When the subscriber places a call to a busy line, or if there is no answer before a time out period expires, the host services computer presents a dialog box form to the subscriber showing the status ("No Answer" or "Busy") and displaying a request prompt "Continue automatic redialing?" [Yes, No]. If redialing is requested, it may be performed by the host services computer or, in the alternative, the central office may be requested to perform repeat dialing by sending the key sequence "*66". Repeat dialing by the central office may be deactivated on the request of the subscriber by notifying the host services computer which, in turn, transmits the dialtone sequence "*68" to deactivate central office repeat dialing.

Figure 4:
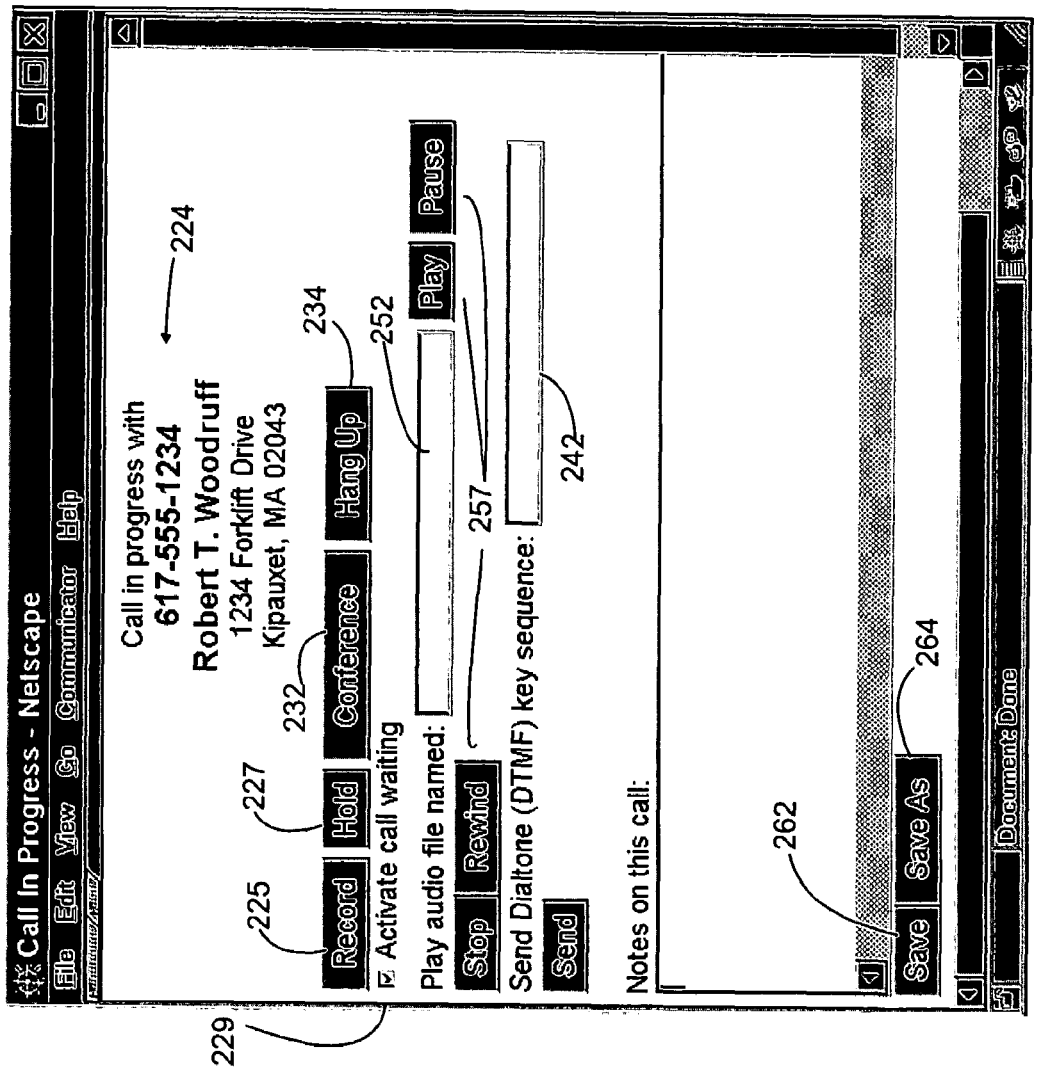
FIG. 4 depicts an illustrative screen display which enables the subscriber to control a call in progress.

Other call in progress controls which are provided by the call-in-progress form of FIG. 4. The button 225 labeled "Record" may be pressed to create a recording of the conversation, preferably by first generating a confirming dialog box and, if desired, informing the called party by voice announcement or signal, as appropriate, that the conversation is being recorded. By pressing the "Hold" button 227, the call in progress may be placed on hold in the normal way so that, for example, an incoming call signaled by the "call waiting" function can be handled. So that more important calls or data connections are not interrupted, call waiting may be deactivated by checking the checkbox at 229. By pressing the button 232 labeled "Conference," the subscriber may request to have additional parties included in a conference call, which is accomplished by again displaying the outgoing call specification form seen in FIG. 3. The subscriber may terminate a call by simply placing the handset on hook in the usual fashion, or by pressing the "Hang up" button 234 which has the same effect.

It is frequently desired to send a predetermined DTMF key sequence after a connection is established in order to perform specialized functions. In addition, it may be desirable to play a predetermined audio file so that it can be heard by the party with whom a connection has been established. To send a DTMF key sequence, it may be entered in text in on the input line at 242 and then sent by pressing the form button 246 labeled "Send." Similarly, the filename or other designation of an audio file recorded at the server computer 41, or the URL of an audio file available on the Internet, may be entered in the input line at 252. The designated audio file is sent over the voice telephone connection under the control of the buttons at 257 labeled "Play," "Pause," "Stop" and "Rewind."

For the convenience of the subscriber, notes on the call in progress may be entered in the memo box seen at 262 in FIG. 2. Pressing the "Save" form button at 264 causes the entered notes to be saved as a file at the server at a location accessible by accessing the phone book entry for the party as discussed in connection with FIG. 6. Alternatively, by pressing the "Save As" button, the subscriber is presented with a form that enables the notes to be saved at a named location on persistent storage accessible to the host services computer. Note that such information is saved at the host services computer 41 and not at the subscriber computer 31 so that the information saved is available to the subscriber regardless of the particular client computer used to access the system. It is an important feature of this aspect of the invention that subscriber may access his or her personal information from any location using any web browser and/or telephone subscriber station, such as a public telephone at an airport.

Phone Book

Figure 6:
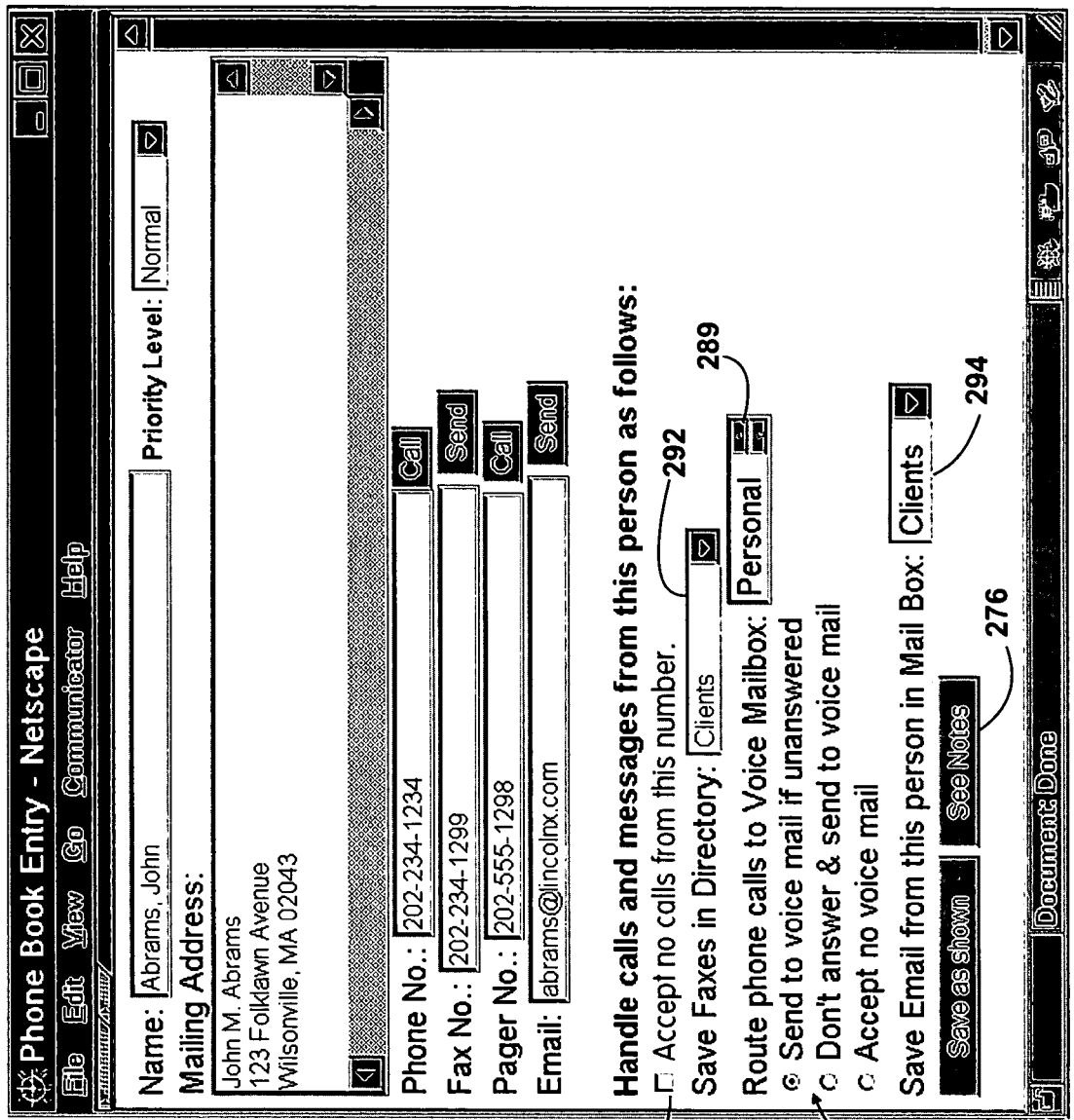
FIG. 6 shows a screen displayed when a form is presented to enable the subscriber to add or edit information in a phone book entry and to take place calls and the like to the person listed.

Frequently called numbers may be accessed and dialed using a phone book database of information. By clicking on the hyperlink anchor text "Phone Book" seen at 270 on the main menu of FIG. 2, a phone book listing page illustrated in FIG. 5 may be displayed. This listing displays an alphabetical list of persons and firms previously stored by the subscriber. Using the page designating navigation bar listing seen at 272 in FIG. 5, the subscriber may go to any desired subsection of the phone book to find an existing listing. By clicking on the name of the person or firm of interest, a form containing more detailed information is presented as shown in FIG. 6. If the person of interest is not found on the listing of FIG. 5, the hyperlink anchor text "Add New" at 274 at the right side of the navigation bar 272 may be clicked on to display a blank for of the type shown in FIG. 5 to enable a new entry to be created.

The form seen at FIG. 6 accepts and, when submitted, stores information about frequently called numbers and is the source of database information displayable at 224 in the call-in-progress form. Notes saved during previous conversations with the person identified on the form may be viewed by pressing the button labeled "See Notes" at 276 in FIG. 6. Note that this button will only be present when notes have been previously recorded for that person or firm; otherwise, the CGI script which generates the form in response to the activation of the associate hyperlink on the form of FIG. 5 will not include the button on the generated form. The phone book data itself may be advantageously stored using a conventional SQL server which interoperates with a relational database (such as the Sybase SQL Server V.11).

The database for each called number potentially includes not only the phone number for that party, but also fax and pager numbers and email addresses. Phone calls, fax transmissions, paging transmissions and email messages may be initiated immediately from the form seen in FIG. 6 by pressing the appropriate one of the activation buttons seen at 280. In addition, by checking the checkbox at 282, calls originating from this caller may be screened and blocked altogether, or may be routed to voice mail according to the instructions provided by the subscriber selectable radio button options indicated at 286. The drop-down list box at 289 permits the subscriber to designate the voice mailbox to which voice mail from this caller is directed. Similarly, the drop-down list boxes at 292 and 294 respectively allow the subscriber to designate the mailbox locations for fax transmission files and email messages received from this caller. When the form is completed to the subscriber's satisfaction, the information it contains is saved for future use in the database maintained by the host services computer when the subscriber presses the "Save as Shown" button 299 at the bottom of the form of FIG. 6.

Call Forwarding

When hypertext option 300 is clicked on the main menu form seen in FIG. 2, the form seen in FIG. 7 is displayed on the subscriber's monitor. This form allows the subscriber to specify the manner in which incoming calls are forwarded and implements "Follow me" call forwarding to enable calls to be automatically forwarded to one of plurality of different numbers in accordance with a predetermined time schedule.

First, at the times when the subscriber is using a particular computer, he or she may place a checkbox at 302 to instruct the host services computer to attempt to establish a voice connection via the Internet using IP telephony to the IP (Internet Protocol) address being used (during this session) by the subscriber computer. IP telephony uses the Internet to send audio between two or more computer users in real time, so the users can converse, and offers the ability to combine voice and data on one network. IP telephony also offers low-cost long distance "telephone" service (assuming the user already has a multimedia PC and a fixed-rate Internet service provider [ISP] account). IP gateways bridge the traditional circuit-switched telephony world with the Internet and offer the advantages of IP telephony to the most common, cheapest, most mobile, and easiest-to-use terminal in the world: the standard telephone. The gateway takes the standard telephone signal, digitizes it (if it is not already digital), significantly compresses it, packetizes it for the Internet using Internet Protocol (IP), and routes it to a destination over the Internet. The gateway reverses the operation for packets coming in from the network and going out the phone. Both operations (coming from and going to the phone network) take place at the same time, allowing a full-duplex (two-way) conversation. Gateway products which may be used at the host services computer 41 are conventional and may be obtained from Dialogic and other vendors, and are compatible with client (subscriber) software which enables the connected subscriber computer to receive and send voice signals over the IP connection. When IP telephony is used, the subscriber uses the handset 37 for voice communications with the handset 37 being connected to the soundcard of the subscriber PC; otherwise, the handset is connected to the telephone subscriber line (which may be shared with the modem 36 for data).

If the checkbox 302 is not checked, the host services computer uses the Internet connection for control functions, but establishes a voice connection via the conventional dialup telephone line. Normally, the host services computer is directed to forward calls to the number entered in the input box at 305 in FIG. 7 except when a time period specified by the four leftmost columns in the table at 310 is satisfied, in which case incoming calls are instead forwarded to the number in the associated right hand column.

The host services computer activates call forwarding by taking the line carrying the incoming call off-hook, sending the key sequence "#72" to the central office and, when dial tone is received from the central office, dialing the forwarding number previously entered by the subscriber on line 2. When the called number answers, call forwarding is activated; otherwise, if there is no answer or a busy signal, a dialog box (not shown in the drawings) is displayed on the subscriber's monitor (if active), asking the subscriber if the attempt to activate call forwarding should be attempted by redialing until canceled.

Message Routing

The subscriber may control the manner in which Email, voicemail and fax transmissions are handled using the form seen in FIG. 8. To affect email handling, the host services computer operates as a POP mailbox and SMTP server for receiving and sending email respectively. In order to coordinate email, voicemail and fax transmission, the host services computer may advantageously employ a set of conventional format conversion functions including: voice to text speech recognition for converting voice mail into text form suitable for transmission via email as well as by voice file MIME attachments to email; optical character recognition for translating fax transmissions into text form for email transmission as well as by MIME fax file attachments to email. The information provided on the form of FIG. 8, which is self explanatory, allows email, fax and voice mail messages to be forwarded, stored, and redirected in a variety of ways in response to option selections made by the subscriber as shown.

Similarly, the form seen in FIG. 9 provides a mechanism for establishing voice mail mailboxes and governing special functions performed by each. As seen at 286 in FIG. 6, incoming calls from persons or firms identified in the phone book database may be automatically routed to voice mailboxes designated using the form of FIG. 9. This form allows the subscriber to set a password or pin number (set and reset by pressing the button at 321), to automatically save and/or forward voice mail routed to this mailbox to specific directories or recipients, and to change the voice mailbox greeting text (recreated by speech synthesis).

Figure 10:
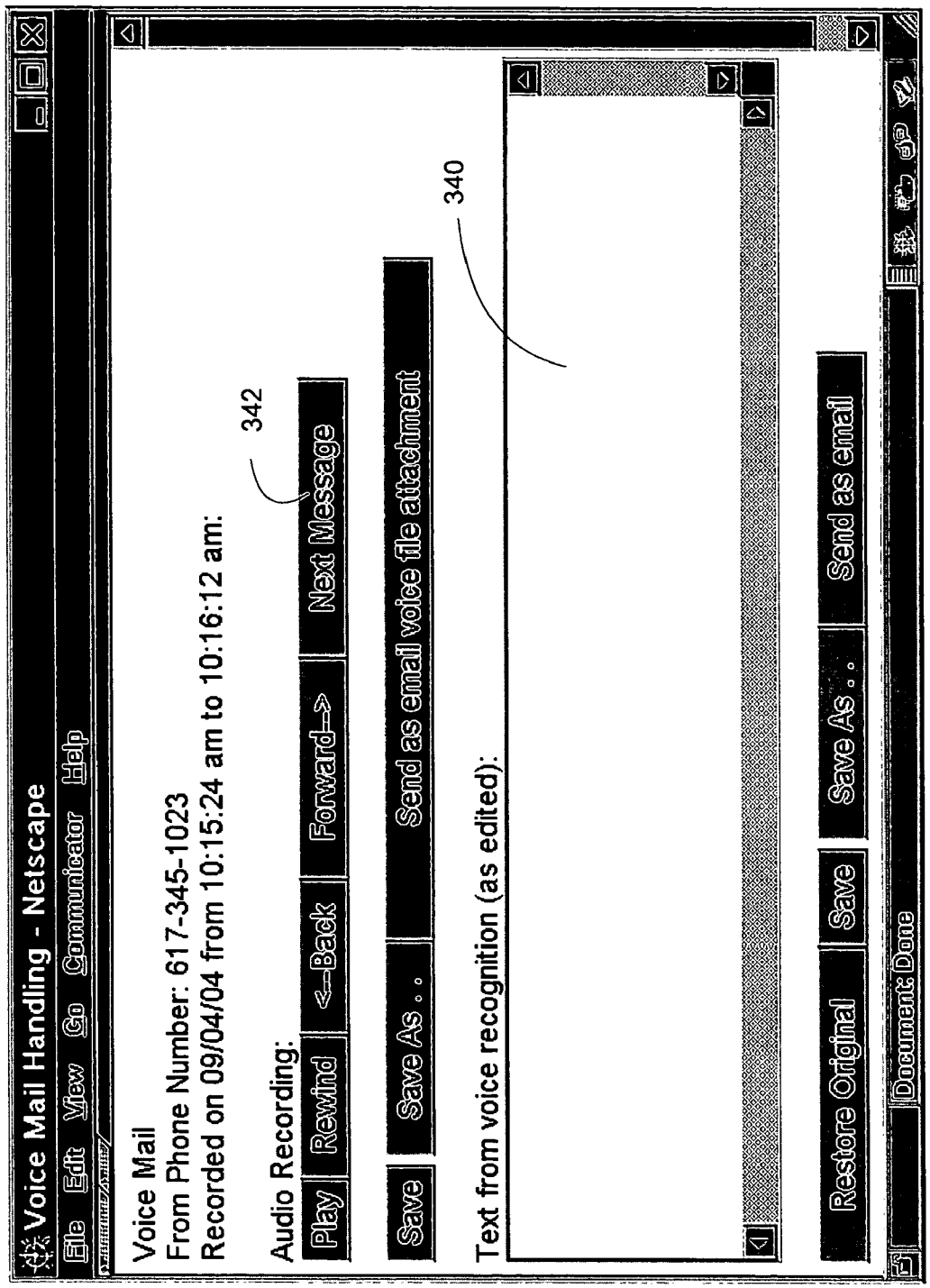
FIG. 10 is a screen display which is allows the subscriber to view and control the playback of voice messages left in a voice mailbox.

The voice mailbox form seen in FIG. 9 further displays a listing of all undeleted voicemail received by this mailbox, along with the date and time recorded and the identification of the caller. By pressing the hypertext link "Review" seen at 333 in FIG. 9, the host services computer sends the HTML page seen in FIG. 10 which displays the voice recognized text of the selected message at 340 and enables the subscriber to control the audio playback of the message using the HTML buttons seen at 342. In addition, the form seen in FIG. 10 enables the subscriber to save the voice mail message as an audio file or send it to as a voice file MIME attachment to email. Similarly, the voice recognized text may be edited by the user using the memo form at 340, and saved or sent as an email attachment.

Paging Services

The subscriber may select the hypertext link option 400 seen on the main menu of FIG. 2 to display a form as seen in FIG. 11 to control paging services. The subscriber enters the phone number of his or her paging service (see 85 in FIG. 1) in the input line box at 422. Using the checkboxes and radio buttons provided on the form of FIG. 11, the subscriber may designate the conditions under which automatic paging is to occur when incoming voice, fax and email messages are received. The form of FIG. 11 also displays a history list of prior automatically generated paging messages for review by the subscriber using the web connection.

Voice and DTMF Controls

In order to control the host services computer using nothing but a conventional telephone stationset, such as the telephone 38 or 81 seen in FIG. 1, conventional voice command interpreters and dialtone control mechanisms may be employed. These techniques, now in common use in voice mail systems, may be implemented using voice command interpretation and speech recognition software components available from Pure Speech Corp. One widely used voice controlled telephone systems which has enjoyed considerable success is the Wildfire System.

In addition to the hardware interface products offered by Dialogic, the Generations TSP system marketed by Voicetek Corp., 19 Alpha Rd., Chelmsford, Mass. provides a telephony server platform that bridges telecommunications and mixed-media information processing networks, linking different communications tools including telephones, computers, faxes, speech recognition and speech synthesis components, and providing services for telephony sequencing, physical interfacing activities and telephony functions.

Speech synthesis programs which may be employed to convert text to speech for replay over the telephone voice connection include: ProVoice (V.2.1)/PrimoVox marketed by First Byte (subsidiary of CUC International, Inc.), 19840 Pioneer Ave. Torrance, Calif. 90503, which enables programmers to add synthesized speech to applications, analyzes and translates text into sound descriptors, phonetic language with pitch, duration and amplitude codes needed to produce stress patterns in phrases and sentences. A second speech synthesis product which may be employed is VoxFonts (V.1.0) sold by Voice Information Systems, Inc., 2118 Wilshire Blvd., Ste. 973, Santa Monica, Calif. 90403, which provides a text-to-speech synthesis library of programs that translates ASCII text into digital audio file, supporting Dialogic and other industry standard formats and uses concatenated human speech for natural sound, and allows the user to add translation rules or specify pronunciations for difficult or foreign words.

Software components for handling Fax-to-Voice translation are available from Malibu Software Group, Inc., 23852 Pacific Coast Hwy., Ste. 909, Malibu, Calif., which faxed document to be converted into spoken words. This fax to voice system provides the ability to receive and store fax documents in user's mailbox similar to regular voice mail messages, and incorporates mechanisms for providing security and control of information. Can be integrated with other voice mail systems.

In general, using conventional speech and command recognition, DTMF tone signaling detection, and speech synthesis techniques for sending voice prompts and information to the user, all of the control functions discussed in detail above using the HTML/CGI interface may be replicated using voice controls via the telephone line, permitting the host services computer to be controlled using either the website or the voice interface. Nonetheless, because voice prompts must be presented sequentially and voice response interpretation is similarly cumbersome in many cases, the web interface contemplated by the present invention provides a preferred control mechanism for many functions.

It is to be understood that the embodiment of the invention which has been described is merely illustrative on one application of the principles of the invention. Numerous modifications may be made by those skilled in the art without departing from the true spirit and scope of the invention.

What is claimed is:

1. A telephone communications system for providing telephone services to a subscriber via the Internet comprising, in combination,
    a host services computer connected to the Internet,
    a subscriber computer accessible to said subscriber connected to the Internet at a location remote from said host services computer,
    call processing apparatus connected to said host services computer,
    said host services computer including data storage means for storing preference values which are accessed by said call processing apparatus to customize the manner in which incoming telephone calls directed to said subscriber are handled on behalf of said subscriber,
    a plurality of telephone lines connecting said call processing apparatus to the public switched telephone network, a particular one of said telephone lines being employed to establish a telephone connection directed to a particular telephone number assigned to said subscriber via the public switched telephone network, and
    a gateway connected between at least said particular one of said telephone lines and the Internet for transforming voice signals transmitted to said subscriber from said public switched telephone network into digitized and packetized voice signals for transmission via the Internet using the Internet Protocol and for transforming digitized and packetized voice signals received from said subscriber via the Internet using the Internet Protocol into voice signals for transmission via the public switched telephone network,
    said call processing apparatus including means for receiving an incoming telephone call directed to said particular telephone number via said particular one of said telephone lines and connecting said incoming call to said subscriber via said particular one of said telephone lines, said gateway and the Internet to said subscriber computer.

2. A telephone communications system for providing telephone services to a subscriber via the Internet as set forth in claim 1 further including a web server coupled to said data storage means and accessible to said subscriber via the Internet for displaying said preference values to said subscriber and for modifying said preference values at the request of said subscriber.

3. A telephone communications system for providing telephone services to a subscriber via the Internet as set forth in claim 2 further including a voice mail storage facility coupled to said call processing apparatus for storing voice mail messages transmitted to said subscriber.

4. A telephone communications system for providing telephone services to a subscriber via the Internet as set forth in claim 3 wherein said web server provides a voice mail web interface to said subscriber for displaying information from said voice mail storage facility to said subscriber and for accepting commands from said subscriber for controlling said voice mail storage facility using a web browser program executed by said subscriber computer.

5. A telephone communications system for providing telephone services to a subscriber via the Internet as set forth in claim 4 wherein said voice mail web interface accepts voice mail playback commands from said subscriber to control the playback of voice mail messages for said subscriber via the Internet.

6. A telephone communications system for providing telephone services to a subscriber via the Internet as set forth in claim 4 wherein said voice mail web interface displays information describing at least selected ones of said voice mail messages transmitted to said subscriber.

7. A telephone communications system for providing telephone services to a subscriber via the Internet as set forth in claim 4 wherein said voice mail storage facility stores said voice mail messages as recorded audio files.

8. A telephone communications system for providing telephone services to a subscriber via the Internet as set forth in claim 7 wherein said voice mail web interface accepts commands from said subscriber for transmitting at least a selected one of said audio recording files via the Internet for storage at said subscriber computer.

9. A telephone communications system for providing telephone services to a subscriber via the Internet as set forth in claim 7 wherein said voice mail web interface accepts commands from said subscriber for transmitting at least a selected one of said audio recording files as an email attachment or link address to a destination email address designated by said subscriber.

10. A telephone communications system for providing telephone services to a subscriber via the Internet as set forth in claim 7 wherein said voice mail web interface accepts commands from said subscriber for altering the greeting message played to a caller who is connected to said voice mail storage facility.

11. A telephone communications system for providing telephone services to a subscriber via the Internet as set forth in claim 4 wherein said voice mail web interface accepts commands from said subscriber for displaying a listing of undeleted voice mail messages stored in said voice mail storage facility.

12. A telephone communications system for providing telephone services to a subscriber via the Internet as set forth in claim 11 wherein said listing displays the date and time each of said undeleted voice mail message was recorded and the identification of the caller.

13. A telephone communications system for providing telephone services to a subscriber via the Internet as set forth in claim 4 wherein said voice mail web interface includes means for establishing a plurality of different voice mailboxes.

14. A telephone communications system for providing telephone services to a subscriber via the Internet as set forth in claim 13 wherein each of said voice mailboxes is designated by a name specified by said subscriber.

15. A telephone communications system for providing telephone services to a subscriber via the Internet as set forth in claim 1 wherein said host services computer further provides an Internet server interface to said subscriber which enables said subscriber to display and edit said preference values via the Internet using a program executed by said subscriber computer to thereby customize the manner in which telephone calls are handled on behalf of said subscriber.

16. A telephone communications system for providing telephone services to a subscriber via the Internet as set forth in claim 1 further comprising the step of employing said call processing apparatus to forward said incoming calls via said public switched telephone network to an alternative destination telephone number as specified by said preference values.

17. A telephone communications system for providing telephone services to a subscriber via the Internet as set forth in claim 1 further including a voice mail storage facility coupled to said call processing apparatus for storing voice mail messages transmitted to said subscriber via said public switched telephone network or via the Internet.

18. A telephone communications system for providing telephone services to a subscriber via the Internet as set forth in claim 17 wherein said voice mail storage facility may be accessed by said subscriber via either said public switched telephone network or the Internet.

19. A method of processing telephone calls on behalf of a subscriber which comprises, in combination, the steps of:
employing a cable modem or other network connection to connect a subscriber computer to a digital Internet Protocol transmission network at an Internet Protocol address assigned to said subscriber computer,
at a host services location remote from said subscriber location, connecting call processing apparatus to the public switched telephone network via a plurality of subscriber lines, including a specific subscriber line for receiving an incoming call directed to a specific telephone number assigned for the exclusive use of said subscriber,
employing a client program that executes on a computer accessible to said subscriber to display, edit and store preference data in a network server accessible to said call processing apparatus, said preference data defining the manner in which said subscriber desires to have telephone calls processed by said call processing apparatus,
employing a gateway connected between said specific subscriber line and said Internet Protocol transmission network for establishing an Internet Protocol voice connection using IP telephony between said specific subscriber line and said subscriber computer via said Internet Protocol transmission network, and
employing said call processing apparatus and said gateway to connect said incoming call to said subscriber computer via said Internet Protocol voice connection to establish a working two-way voice connection via said Internet Protocol voice connection and said specific subscriber line.

20. The method of processing telephone calls on behalf of a subscriber as set forth in claim 19 further comprising the step of employing said call processing apparatus to forward said incoming calls via said public switched telephone network to an alternative destination telephone number as specified by said preference data.

21. The method of processing telephone calls on behalf of a subscriber as set forth in claim 19 wherein said gateway digitizes voice signals from said specific subscriber line to form digital voice signals, compresses and packetizes said digital voice signals to form Internet Protocol packets, and transmits said packets via said Internet Protocol transmission network to said subscriber computer.

22. The method of processing telephone calls on behalf of a subscriber as set forth in claim 21 wherein said gateway receives Internet Protocol packet signals from said subscriber computer via said Internet Protocol transmission network and transforms said packet signals into voice signals which are transmitted via said specific subscriber line to the public switched telephone network.

23. The method of processing telephone calls on behalf of a subscriber as set forth in claim 22 further including a voice mail storage facility coupled to said call processing apparatus for storing voice mail messages transmitted to said subscriber.

24. The method of processing telephone calls on behalf of a subscriber as set forth in claim 23 wherein said client program displays information describing at least selected ones of said voice mail messages transmitted to said subscriber.

25. The method of processing telephone calls on behalf of a subscriber as set forth in claim 19 wherein said preference data includes phone book data entries at least some of which identify a specific party by name and further specify the phone number of said specific party.

26. The method of processing telephone calls on behalf of a subscriber as set forth in claim 25 wherein said web sewer further stores phone book data which identify a particular party by name and further specify a network address on said Internet Protocol transmission network for said particular party.

27. The method of processing telephone calls on behalf of a subscriber as set forth in claim 26 wherein said network address for said particular party is an email address.

* * * * *